US00RE44177E

(19) United States
(12) Reissued Patent
O'Donnell et al.

(10) Patent Number: US RE44,177 E
(45) Date of Reissued Patent: Apr. 30, 2013

(54) RAILROAD CAR ENERGY ABSORPTION APPARATUS

(75) Inventors: William P. O'Donnell, Aurora, IL (US); Michael D. VanMaldegiam, North Aurora, IL (US); Erik D. Jensen, Batavia, IL (US); Donald E. Wilt, Batavia, IL (US); Michael S. Dillon, Cortland, IL (US)

(73) Assignee: Miner Enterprises, Inc., Geneva, IL (US)

(21) Appl. No.: 11/512,392

(22) Filed: Aug. 29, 2006

Related U.S. Patent Documents

Reissue of:
(64) Patent No.: 6,792,871
Issued: Sep. 21, 2004
Appl. No.: 10/289,951
Filed: Nov. 7, 2002

(51) Int. Cl.
*E01B 3/00* (2006.01)

(52) U.S. Cl.
USPC ..... 104/16

(58) Field of Classification Search ..... 105/199.3, 105/199.1, 157.1, 164, 392.5; 267/153, 269
See application file for complete search history.

(56) References Cited

U.S. PATENT DOCUMENTS

| | | | | |
|---|---|---|---|---|
| 3,556,503 | A | 1/1971 | von Moss, Jr. | |
| 3,670,661 | A | 6/1972 | Pangalila | |
| 3,735,711 | A | 5/1973 | Hassenauer | |
| 3,910,655 | A | 10/1975 | Willison et al. | |
| 3,932,005 | A | 1/1976 | Miller | |
| 4,355,583 | A | 10/1982 | Eggert | |
| 4,567,833 | A | 2/1986 | Hanson | |
| 4,998,997 | A | 3/1991 | Carlston | |
| 5,386,783 | A | 2/1995 | Rhen et al. | |
| 5,601,031 | A * | 2/1997 | Carlson | 105/199.3 |
| 6,092,470 | A * | 7/2000 | O'Donnell | 105/199.3 |
| 6,708,624 | B2 * | 3/2004 | Faryniak et al. | 105/218.2 |
| 2003/0106456 | A1 | 6/2003 | Faryniak et al. | |
| 2005/0087092 | A1 * | 4/2005 | McKisic et al. | 105/199.3 |

OTHER PUBLICATIONS

Photograph of side bearing assembly cap, spring and base with roller arranged in disassembled relation relative to each other (available about Jan. 2002).
Photograph of side bearing assembly cap, spring and base with roller arranged in assembled relation relative to each other (available about Jan. 2002.
Photograph of side bearing assembly cap removed from the side bearing assembly base and spring (available about Jan. 2002).
Photograph of side bearing assembly cap, spring and base in assembled relation relative to each other (available about Jan. 2002).
Photograph of side bearing cap and base arranged in disassembled relation relative to each other (availabloe about Jan. 2002).
Photograph of side bearing assembly cap, spring and base in assembled relation and with roller being disassembled therefrom (available about Jan. 2002).

(Continued)

*Primary Examiner* — Robert McCarry, Jr.
(74) *Attorney, Agent, or Firm* — Law Office of John W. Harbst

(57) ABSTRACT

A railroad car energy absorption apparatus is disclosed. The railroad car energy absorption apparatus includes a spring assembly having an elastomer spring element arranged in operable combination with structure for inhibiting localized heat deterioration of the elastomer spring element.

38 Claims, 3 Drawing Sheets

OTHER PUBLICATIONS

Photograph of a Stucki Co elastomeric spring arranged in disassembled relation from the side bearing assembly base (available about Jan. 2002).
Photograph of side bearing assembly cap, spring and base arranged in disassembled relation relative to each other (available about Jan. 2002).
Photograph of side bearing assembly cap, spring and base arranged in assembled relation with roller in non-operative position (available about Jan. 2002.
Photograph of side bearing assembly (available about Sep. 2002).
Photograph of side bearing assembly base, spring and roller in assembled relation and with the side bearing cap being removed therefrom (available about Sep. 2002).
Photograph of side bearing assembly base with roller (available about Sep. 2002).
Photograph of a Stucki Co elastomeric spring (available about Sep. 2002).
Miner Enterprises,Inc.; TecsPak Constant Contact Side Bearings; 1996; 2 pages; Geneva, IL.; USA.

* cited by examiner

RAILROAD CAR ENERGY ABSORPTION APPARATUS

Matter enclosed in heavy brackets [ ] appears in the original patent but forms no part of this reissue specification; matter printed in italics indicates the additions made by reissue.

FIELD OF THE INVENTION

The present invention generally relates to a railroad car energy absorption apparatus and, more particularly, to a railroad car energy absorption apparatus including a spring assembly having an elastomer spring element arranged in operable combination with structure for inhibiting localized heat deterioration of the elastomer spring element.

BACKGROUND OF THE INVENTION

An energy absorption apparatus is known to be utilized on a railroad car in various applications and between two masses. For example, an energy absorption apparatus is typically arranged in operable combination with a railroad car draft gear for absorbing forces between adjacent ends of railroad cars. A railroad car energy absorption apparatus is also commonly configured as a side bearing. A railroad car side bearing is typically disposed to opposite sides of a car body between a centerpiece or bolster of a wheeled truck and an underside of the railroad car body. During movement of the railcar, each side bearing acts as an energy absorption apparatus and furthermore serves to control or restrict "hunting" movements of the railcar.

Hunting is a phenomenon created by the wheeled trucks during movement of the railway vehicle over tracks or rails. The coned wheels of each truck travel a sinuous path along a tangent or straight track as they continually seek a centered position under the steering influence of wheel conicity. In traveling such a sinuous path, a truck will yaw cyclically in an unstable fashion with respect to the car body about an axis defined by a vertical centerline of the truck bolster. Hunting, and the resulting side or lateral translation or oscillation of the railway car body is of particular significance when the car is traveling in an empty condition at relatively high speeds, e.g., in excess of 45 miles per hour. Of course, the truck also tends to yaw or rotate quasi-statically with respect to the car body in negotiating curved sections of track. Suffice it to say, excessive hunting can result in premature wear of the wheeled truck components including the wheels. Hunting can also cause damage to lading being transported in the railroad car body.

Known railroad car energy absorption devices typically use compressed resilient members such as spring loaded steel elements or elastomeric blocks or columns or both. The spring loaded steel elements, utilizing a steel on steel friction interface, proved ineffective in some applications because of seizing and galling problems. Recently different forms of thermoplastic elastomers have advantageously been used to develop the necessary force absorption characteristics required for such railroad car uses. One such elastomer is marketed and sold by the Assignee of the present invention under the tradename "TecsPak".

Regardless of the application, the buildup of heat in proximity to the thermoplastic spring is a serious concern. During operation of the railroad car and use of such energy absorption apparatus, heat develops. Unless such heat buildup can be controlled, however, the thermoplastic spring will tend to soften and deform, thus, adversely affecting the operable performance of the railroad component with which it finds utility. For example, as a wheeled truck yaws back and forth, an undersurface of the railcar body slides across and relative to a metal top plate of the side bearing which is biased against the undersurface of the railcar body by the elastomeric spring. The resulting friction advantageously produces an opposite torque which acts to inhibit yaw motion. Such resulting friction also typically causes an excessive amount of heat at the interface between the top plate and the underside of the car body. Such heat buildup often exceeds the heat deflection temperature of the thermoplastic spring. As used herein and throughout, the term "heat deflection temperature" means and refers to a temperature level at which the related component, regardless of its composition, tends to soften and deform.

When such localized heat created by the friction between the side bearing and the car body exceeds its heat deflection temperature, the elastomeric spring will tend to deform and/or, when the temperature is high enough, cause melting of the elastomeric spring. Deformation and melting of the elastomeric spring significantly reduces the ability of the spring to apply a proper preload force and, thus, decreases vertical suspension characteristics of the side bearing which, in turn, results in enhanced hunting of the wheeled truck. Enhanced hunting and/or unstable cyclic yawing of the truck increases the resultant lateral translation/oscillation of the railcar leading to a further increase in the levels of heat buildup and further deterioration of the elastomeric spring.

Thus, there is a need and continuing desire for a railroad car energy absorption apparatus having a spring assembly including an elastomeric spring arranged in operable combination with structure for inhibiting deterioration of the elastomeric spring resulting from localized heat.

BRIEF SUMMARY OF THE INVENTION

In view of the above, there is provided a railroad car energy absorption apparatus which is specifically designed to limit the adverse affects local heat has on such apparatus. In accordance with one aspect of the invention, a railroad car side bearing assembly is adapted to be disposed intermediate an elongated bolster and a car body of a railway vehicle. The side bearing includes a housing and a cap or top plate which is movable toward and away from the housing. Both the housing and cap include wall structure which, when the cap is arranged in operable combination with the housing, combine to define a cavity or void in the side bearing. An elastomeric spring is accommodated within the cavity between the housing and cap for urging the surface on the cap against the bottom of the car body. According to one aspect of the present invention, the housing wall structure and the cap wall structure are each configured to promote dissipation of heat away from the elastomeric spring thereby prolonging effective usefulness of the side bearing assembly.

The elastomeric spring is preferably formed from a thermoplastic elastomer capable of imparting a predetermined preload or force to the cap or plate of the side bearing assembly to inhibit hunting movements of the wheeled truck as the railroad car moves along the tracks. In a preferred embodiment, the elastomeric spring defines a generally centralized throughbore which opens at opposite ends in the direction of spring compression.

Preferably, the housing wall structure and the cap wall structure are each configured to limit generally horizontal shifting movements of the cap relative to a longitudinal axis of the housing. Moreover, the housing and cap are each configured to allow movement of the cap relative the housing while inhibiting rotation therebetween.

In a preferred embodiment, the housing wall structure has a noncomplete configuration toward a free end thereof In one form, the housing wall structure comprises only between about 30% and about 70% of a free end boundary of the housing wall structure. More specifically, the housing wall structure preferably defines openings arranged to opposed lateral sides of a longitudinal axis of the side bearing and which generally align with openings in the cap wall structure to permit air to move into the side bearing, around the elastomeric spring, and, ultimately, from the cavity whereby venting heat away from the elastomeric spring thereby prolonging usefulness of the side bearing assembly.

Preferably, the openings defined by the cap wall structure extend away from a planar surface of the cap and toward a free end of the cap wall structure for a distance measuring between about 35% and about 60% of a distance measured between the planar surface of the cap and the free end wall structure of the cap. Moreover, in a preferred embodiment, the planar car body engaging surface of the cap is configured to promote both free and forced convection of heat from the cavity wherein the elastomeric spring is operably disposed.

In that embodiment wherein the elastomeric spring has a centralized throughbore, at least one of the housing and the cap is provided with a guide to positively position the elastomeric spring relative to the other side bearing components. Additionally, at least one of the cap and housing has a stop for limiting movement of the cap toward the housing and thereby controlling spring compression during operation of the railroad car side bearing.

In accordance with another aspect, there is provided a spring assembly including an elastomeric spring whose elongated axis defines a longitudinal axis of said spring assembly and which has a thermal insulator or air spacer arranged in operable combination therewith to restrict conductive heat transfer to the spring. The thermal insulator defines one end of the spring assembly and is configured to direct air to move across the thermal insulator in a direction generally normal to the longitudinal axis of the spring thereby promoting convective heat transfer away from the elastomeric spring whereby prolonging usefulness of said spring assembly.

As will be appreciated from an understanding of this disclosure, the principals inherent with providing a thermal insulator in combination with a railroad car spring assembly are equally applicable to substantially any shape or design of thermoplastic spring arranged in combination therewith. In a preferred embodiment, the thermoplastic elastomer spring has a generally cylindrical-like configuration between opposed ends. Preferably, the elastomeric spring defines an open ended recess arranged adjacent to the thermal insulator.

In a most preferred form, the elastomeric spring has a generally centralized bore opening at opposite ends of the elastomeric spring. Moreover, in a preferred form, the thermal insulator is likewise provided with a generally centralized throughbore open at opposite ends.

The thermal insulator is preferably formed from a nylon or other suitable thermoplastic material having a relatively high impact strength and low thermal conductivity. Suffice it to say, the material used to form the thermal insulator has a heat deflection temperature which is significantly greater than a heat deflection temperature of the elastomer used to form the elastomeric spring. In a preferred embodiment, the thermal insulator generally comprises about ⅕ to about 1/20 of the distance between opposed ends of the spring assembly. In one form, the thermal insulator includes spaced and generally parallel surfaces defining a distance of about 0.250 inches and about 1.0 inch therebetween.

The thermal insulator is preferably provided with structure for operably securing the insulator to the elastomeric spring. To facilitate assembly of the spring, and to further ensure appropriate matching of the spring assembly with the railroad car component with which it is intended to find utility, the thermal insulator is preferably color coded to visually indicate certain characteristics of the elastomeric spring arranged in operable combination therewith.

In one form, a free end of the thermal insulator includes a series of buttons or lugs arranged in a uniform pattern relative to each other such that opposed sides of adjacent buttons defining a passage therebetween. The passages defined between adjacent buttons extend across the thermal insulator in generally normal relation relative to the longitudinal axis of the spring assembly. Preferably, a free end of the series of buttons combine to define a generally planar surface, and with the free end of the buttons collectively comprising between about 30% and about 75% of the total surface area of one end of the spring assembly. In one embodiment, the buttons generally comprise about ⅜ to about ¾ of a distance between generally parallel surfaces on the thermal insulator. Alternatively, the series of buttons or lugs project from and are operably associated with a metal plate to promote transfer of heat from the elastomeric spring.

According to another aspect, the apparatus for absorbing energy includes a housing adapted to be arranged in operable combination with one of two masses. Such apparatus further includes a member mounted in movable and generally coaxial relation relative to the housing. Such member defines a surface adapted to be arranged in operable relation with the other of two masses. Such apparatus furthermore includes a spring assembly adapted to be disposed between the housing and member for absorbing energy imparted to said apparatus by either or both of said first or said second masses. The spring assembly includes an elastomeric spring and a thermal insulator defining that end of the spring assembly adapted to be disposed adjacent the member, and wherein the thermal insulator is adapted to restrict conductive heat transfer from such member to the elastomeric spring. Furthermore, the thermal insulator is configured to direct air across an interface between the thermal insulator and the member thereby promoting convective heat transfer from that end of the elastomeric spring arranged adjacent the member so as to prolong usefulness of the spring assembly.

According to still another aspect of the present invention, there is provided an elastomeric spring assembly including an elongated thermoplastic spring having first and second axially spaced ends and an encapsulator arranged relative to the first end of the spring. As will be appreciated, certain elastomers tend to deform as a result of repeated heat cycling applied to a localized area of the thermoplastic spring and at temperatures of about 250° F. As such, the purpose of the encapsulator is to inhibit deterioration and radial deflection of the first end of the spring as a result of repeated heat cycling applied to the thermoplastic spring.

In a preferred form, the encapsulator includes a closed band extending about and axially along a lengthwise distance of the thermoplastic spring. As will be appreciated by those skilled in the art, the axial distance the closed band extends along an outer surface of the elastomeric spring in minimized to maximize the operational characteristics of the elastomer spring while allowing the band to remain effective to achieve the intended purpose.

According to yet another aspect, there is provided a spring assembly including an elastomeric spring having predetermined load-deflection characteristics and disposed between two masses. The spring assembly further includes an encapsulator for inhibiting the associated local portion of elastomeric spring from deforming after exposure to heat deflection temperatures which would normally cause spring performance deformation or deterioration whereby assisting the elastomeric spring to maintain its predetermined load-deflection characteristics.

When the apparatus for absorbing energy is designed as a railroad car side bearing, the closed band on the spring assembly is arranged toward that end of the spring adapted to be exposed to increased heat levels which commonly result during operation of the railroad car side bearing. As such, the closed band inhibits that end of the spring exposed to heat from deforming as a result of "hunting" movements of the wheeled trucks on the railroad car.

When the energy absorption apparatus is configured as a railroad car side bearing, and to further address concerns regarding heat deterioration of the elastomeric spring, besides having one end of the spring surrounded by a closed band, the housing and cap of the side bearing are preferably configured as described above to allow heat to enter the cavity wherein the elastomeric spring is disposed, circulate about the spring, and, ultimately, pass from the side bearing to dissipate heat buildup and, thus, prolong useful life of the railroad car side bearing.

Accordingly, one object of this invention is to provide a railroad car energy absorption apparatus which is designed to limit the adverse affects localized heat has on such apparatus.

Another object of this invention is to provide an elastomeric spring assembly including an elastomeric spring including structure for inhibiting deterioration of the spring as a result of heat.

Still another object of this invention is to provide an elastomeric spring assembly which is designed to provide predeterminable load characteristics and which is structured to maintain the configuration of the spring so as to consistently provide such predeterminable load characteristics notwithstanding the operational heat applied thereto during operation of the spring assembly.

Another purpose of the is invention is to provide an elastomeric spring assembly which is designed to limit physical deformation of the elastomeric spring notwithstanding repeated exposure to heat deflection temperatures which would normally cause heat deformation of the elastomeric spring.

Still another object of this invention is to provide an apparatus including an elastomeric spring adapted to absorb and return energy between two masses and wherein a thermal insulator is arranged in operable combination with and is intended to restrict heat transfer to one end of the elastomeric spring by directing air across an interface between the thermal insulator and that movable mass with which the apparatus is in contact thereby promoting conductive heat transfer from that end of the elastomeric spring arranged proximate to the movable mass.

Yet another object of this invention is to provide a railroad car side bearing which includes an elastomeric spring for resiliently urging a cap against and into sliding contact with an undersurface of a railway vehicle and wherein wall structures on a housing and cap of the side bearing are configured relative to each other to promote convection of heat away from the elastomeric spring thereby prolonging usefulness of the railroad car side bearing.

Still a further purpose of this invention is to design a railroad car side bearing such that an elastomeric spring arranged in combination therewith is protected against heat damage resulting from hunting movements of a wheeled truck on which the side bearing is mounted.

Another purpose of this invention is to produce an economical and cost efficient railroad car side bearing utilizing an elastomeric spring which is protected against heat damage resulting from hunting movements of a wheeled truck on which the side bearing is mounted.

These and other objects, aims, and advantages of the present invention are more fully described in the following detailed description, the appended claims, and drawings.

DETAILED DESCRIPTION OF THE INVENTION

The present invention is susceptible of embodiment in multiple forms and there is shown and will hereinafter be described preferred embodiments of the invention, with the understanding the present disclosure is to be considered as setting forth exemplifications of the invention which are not intended to limit the invention to the specific embodiments illustrated and described.

Figure 1:
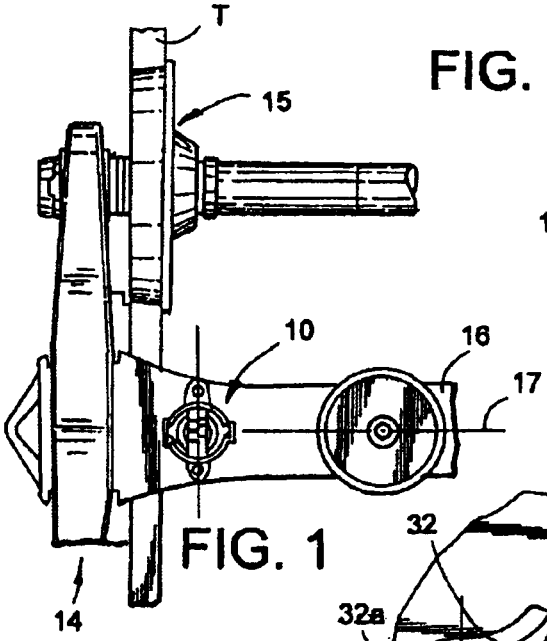
FIG. 1 is a top plan view of a portion of a railroad car wheeled truck including one form of an energy absorption apparatus embodying principals of the present invention.
Figure 3:
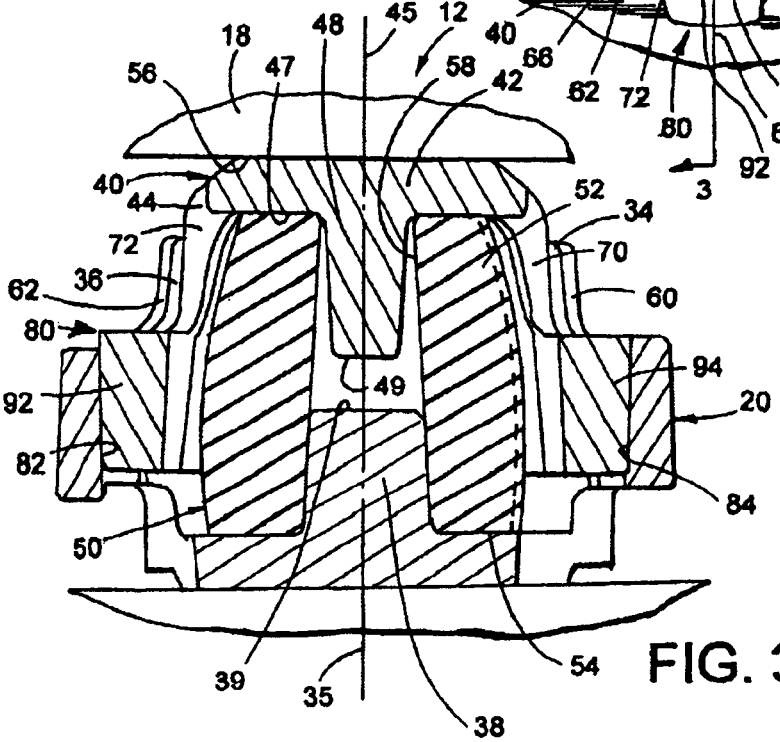
FIG. 3 is a sectional view taken along line 3-3 of FIG. 2.

Referring now to the drawings, wherein like reference numerals refer to like parts through out the several views, a railroad car energy absorption apparatus is shown in FIG. 1 and is generally identified by reference numeral 10. The railroad car energy absorption apparatus 10 can take a myriad of different shapes without detracting or departing from the true spirit and scope of the present invention. In one embodiment, the energy absorption apparatus 10 is shown as a railroad car side bearing which is mounted on a railroad car 12 (FIG. 3). More specifically, the side bearing 10 is mounted on and in operable combination with a wheeled truck 14 forming part of a wheel set 15 which allows the railway vehicle or car 12 to ride along and over tracks T. As known, side bearing 10 is mounted on a transversely disposed, partially illustrated, bolster 16 having a longitudinal axis 17 and forming part of the wheeled truck 14 serving to operably support a side and one end of the railroad car body 18 (FIG. 3) forming part of railcar 12.

Figure 2:
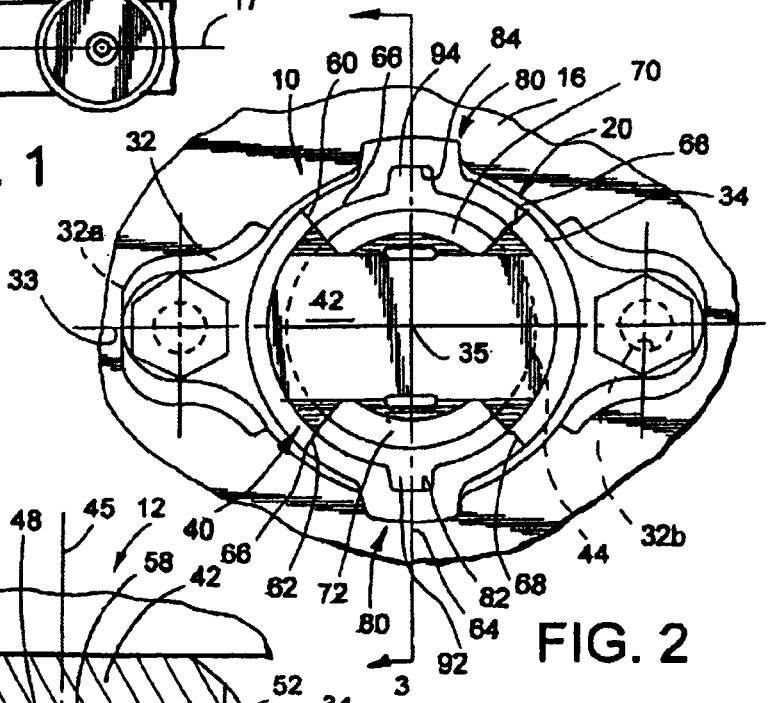
FIG. 2 is an enlarged top plan view of the energy absorption apparatus shown in FIG. 1 rotated 90° from the position shown in FIG. 1.

The outer configuration of the side bearing 10 is not an important consideration of the present invention. The illustrated side bearing 10 is intended only for exemplary purposes. Whereas, the principals and teachings of the present invention are equally applicable to other forms and shapes of side bearings. Turning to FIG. 2, side bearing 10 includes a housing or cage 20, a cap or member 40 arranged for generally coaxial movement relative to the housing 20, and a spring assembly 50 (FIG. 3) operably disposed between the housing 20 and cap 40.

As shown in FIG. 2, housing 20 of the side bearing 10, illustrated for exemplary purposes, is preferably [formed] *fabricated* from metal and includes a base 32 configured for suitable attachment to the bolster 14 as through any suitable means, i.e., threaded bolts or the like. In the illustrated embodiment, base 32 includes diametrically opposed openings or holes 32a and 32b allowing the suitable fasteners to extend endwise therethrough for fastening the base 32 and, thus, housing 20 to the bolster 16. Preferably, the openings 32a and 32b in the base [30] *32* are aligned along an axis 33 such that when housing 20 is secured to bolster 16, axis 33 *extends* generally perpendicular or normal to the longitudinal axis 17 of bolster 16 *and generally parallel to a longitudinal axis 13* (*FIG. 1*) *of car 12*.

In the illustrated embodiment, housing 20 further includes wall structure 34 extending [from the base 30 to define] *upward from a bottom 31* (*FIG. 3*) *of housing 20. The wall structure 34 defines* an axis 35 (FIG. 3) for housing 20. [The] *In a preferred form, the* wall structure 34 [preferably] has a generally round cross-sectional configuration and defines an interval void or [open] *open-top* cavity 36 wherein spring assembly 50 is accommodated. As shown in FIG. 3, a spring guide or projection 38 is preferably provided and is centrally located on the base 32 within the cavity 36 of the housing 20. Moreover, the spring guide 38 preferably defines a flat or stop 39.

*Housing 20 of the side bearing 10 is configured to promote the dissipation of heat from the cavity 36 an away from the elastomeric spring assembly 50. In the embodiment illustrated in FIG. 3, housing 20 defines apertures 35 and 37 preferably arranged toward the bottom 31 of housing 20 and open to the cavity 36. In one form, the apertures or openings 35 and 37 are disposed in generally normal or perpendicular relation relative to the axis 33 along which the openings 32a and 32b are aligned.*

Like housing 20, cap or member 40 is preferably formed from metal. Moreover, cap or member 40 is adapted to telescopically move relative to housing 20. A top plate 42 of cap 40 has a generally planar configuration for frictionally engaging and establishing metal-to-metal contact with an underside or surface of the car body 18. In the illustrated embodiment, cap or member 40 includes wall structure 44 depending from and, preferably, formed integral with the top plate 42 to define an axis 45 extending generally coaxial with axis 35 of housing 20. As shown, the wall structure 44 of cap 40 has a generally round cross-sectional configuration and defines an interval void or open cavity 46. In the illustrated embodiment, the housing wall structure 34 and the cap wall structure 44 are configured to complement and operably cooperate relative to each other to surround and accommodate the spring assembly 50 therewithin. As will be appreciated, if the wall structure 34 of housing 20 is designed with other than a generally round cross-sectional configuration, the cross-sectional configuration of the wall structure 44 of the cap or member 20 would similarly change.

In the illustrated embodiment, cap or member 40 also includes a spring guide or projection 48 generally centrally disposed within the cavity 46 and depending from an undersurface 47 of the top plate 42. Preferably, the spring guide 48 defines a flat or stop 49 disposed in confronting relation relative to stop 39 on housing 20.

Like the overall side bearing, the shape of form of the spring assembly 50 can be varied or different from that illustrated for exemplary purposes without detracting or departing from the spirit and scope of the present invention. In the illustrated form, spring assembly 50 defines a central axis and comprises a formed, resiliently deformable thermoplastic elastomer member 52 having a configuration suitable to accommodate insertion between the housing 20 and the cap or member 40. The thermoplastic member 52, illustrated for example in FIG. 3, preferably includes a vertically elongated, generally cylindrical configuration between opposed ends or surfaces 54 and 56. As shown, the elastomeric member 52 defines a generally centralized hole or throughbore 58 opening at opposite ends to surfaces 54 and 56. It should be appreciated, however, the thermoplastic elastomer member 52 could also be solidly configured. Moreover, the elastomer member 52 can be formed as a composite structure similar to that disclosed in coassigned U.S. Pat. No. 5,868,384; the applicable portions of which are hereby incorporated by reference.

Suffice it to say, the thermoplastic elastomer member 52 can be formed from a myriad of elastomeric materials. Preferably, the thermoplastic elastomer member 52 is formed from a copolyesther polymer elastomer manufactured and sold by DuPont Company under the tradename HYTREL. Ordinarily, however, a HYTREL elastomer has inherent physical properties that make it unsuitable for use as a spring. Applicant's assignee, however, has advantageously discovered that after shaping a HYTREL elastomer into the appropriate configuration, it is possible to advantageously impart spring-like characteristics to the elastomer member. Coassigned U.S. Pat. No. 4,198,037 to D. G. Anderson better describes the above noted polymer material and forming process and is herein incorporated by reference to the extent applicable. When used as a spring, the thermoplastic elastomer member 52 has an elastic to strain ratio greater than 1.5 to 1.

The purpose of spring assembly 50 is to position the top plate 42 of cap 40 relative to housing 20 and to develop a predetermined preload or suspension force thereby urging plate 42 toward an into frictional engagement with an undersurface of the car body 18. The preload or suspension force on the cap or member 40 allows absorption of forces imparted to the side bearing 10 when the car body 18 tends to roll, i.e., oscillate about a horizontal axis of car body 18 and furthermore inhibits hunting movements of the wheeled truck 14 relative to the car body 18.

During travel of the railway vehicle 12, the wheeled truck 14 naturally hunts or yaws about a vertical axis of the truck, thus, establishing frictional sliding or oscillating movements at and along the interface of the top plate 42 of the side bearing cap or member 40 and the underside of the car body 18 thereby creating significant and even excessive heat. As will be appreciated, when the heat at the interface of the side bearing 10 and an undersurface of the car body 18 exceeds the heat deflection temperature of the thermoplastic member 52 deterioration, deformation and even melting of the thermoplastic member 52 results, thus, adversely affecting predetermined preload characteristics provided by spring assembly 50

Figure 4:
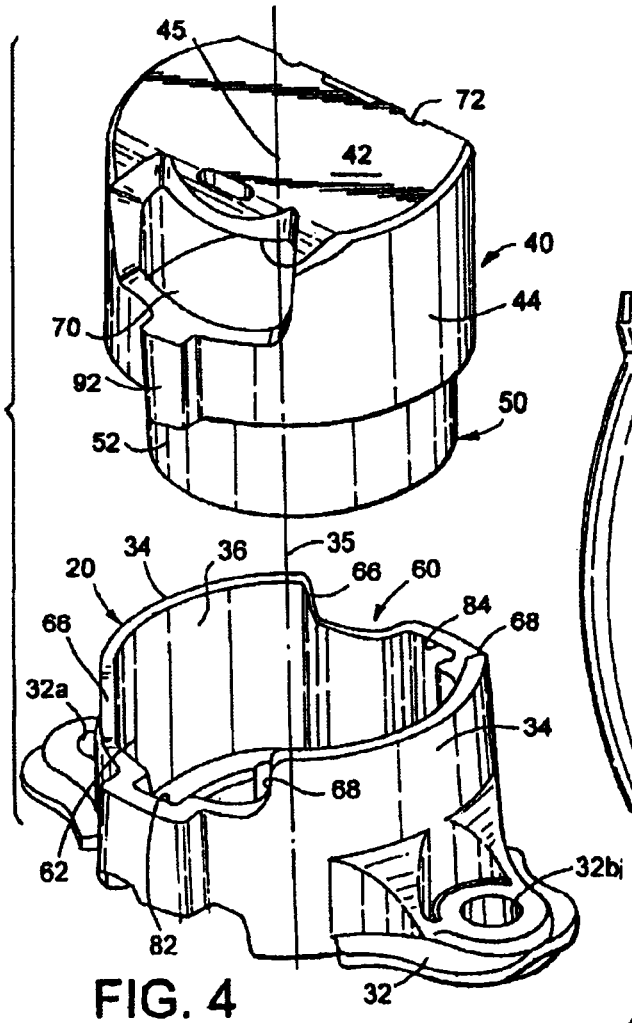
FIG. 4 is a perspective view of the energy absorption apparatus illustrated in FIG. 2.

Accordingly, one aspect of the present invention involves configuring the energy absorption apparatus 10 to promote dissipation of heat away from the elastomeric spring assembly 50 thereby prolonging the usefulness of the apparatus 10. More specifically, and as shown in FIGS. 3 and 4, the wall structure 34 of the housing 20 defines openings 60 and 62 disposed to opposite lateral sides of the longitudinal axis of the 35 defined by housing 20. Notably, the openings 60, 62 defined by the housing 20 are generally aligned relative to each other and along an axis 64 extending generally normal to the axis 35 of housing 20. Each opening 60, 62 is preferably defined by a channel which opens to and extends away from the free end of the wall structure 34 and, in the exemplary embodiment, has opposed generally parallel sides 66 and 68. As such, the free end boundary of the wall structure 34 has a non-complete configuration. That is, and to promote air flow into and from the side bearing 10, the total area defined between opposed sides 66, 68 of the openings 60, 62 cumulatively measures only about 35% to about 70% of the total area defined by the free end boundary of the wall structure 34 on housing 20.

The cap 40 of the energy absorption apparatus 10 is configured in a manner complementing the vented configuration of the housing 20 whereby allowing air to pass into the side bearing 10 and toward the thermoplastic spring member 52 of spring assembly 50, around the thermoplastic spring member 52, and, ultimately, pass from the side bearing 10. [As] *In the embodiment* shown in FIGS. 2, 3 and 4, the wall structure 44 of the side bearing cap 40 defines*, at least in part,* a pair of openings 70 and 72 disposed to opposite lateral sides of the axis 45 of cap 40 *and, preferably, in generally normal relation relative to the axis 33 along which the openings 32a and 32b are aligned.* [The] *Preferably, the* openings 70, 72 defined by cap 40 are generally aligned relative to each other and are shaped in a manner complementing the openings 60, 62 in housing 20. Notably, and although configured to promote heat transference from side bearing 10, the wall structures 34 and 44 of housing 20 and cap 40, respectively, are configured to coact with each other and are sufficiently strong to limit shifting movements of the cap 40 relative to a longitudinal axis of and during operation of the side bearing 10.

As shown in FIGS. 2 and 4, the openings 70, 72 defined by the side bearing cap 40 preferably extend away from the top plate 42 of cap 40 toward a free end of the wall 44 for a distance measuring between about 35% and about 60% of a distance measured between the upper surface of the top plate 42 and the free end of the wall structure 44. As shown in FIG. 3, a portion of the vents 70, 72 defined by cap or member 40 preferably open to the side bearing top plate 42 whereby promoting free convection cooling of the side bearing 10. *As shown in FIG. 3, the plurality of openings 70, 72 defined by the cap or member are wholly unobstructed by the underside 56 of the car body 18 such that air passages are defined between the apertures 33, 35 arranged toward bottom 31 of the housing 20 and the openings 70, 72 in the cap 40.* Suffice it to say, according to this aspect of the invention, cooling of the energy absorption apparatus can be beneficially accomplished by the design of the side bearing structure resulting in free convection of heat away from the elastomeric member 52 based on temperature gradients and/or forced convection of heat away from the elastomeric member 52 resulting from railcar movement.

In the exemplary embodiment, the side bearing housing 20 and cap 40 define cooperating instrumentalities, generally identified by reference numeral 80. The purpose of the cooperating instrumentalities is to maintain the openings 70, 72 in cap 40 in communicable relation with the openings 60, 62 in housing 20 whereby allowing the free flow of air into the side bearing 10 and toward the elastomeric spring assembly 50, around the elastomeric spring assembly 50, and, ultimately, away from the elastomeric spring assembly 50 and the side bearing 10 whereby promoting heat exchange at an accelerated pace.

As will be appreciated, the cooperating instrumentalities 80 can take many forms and shapes to accomplish the desired purpose. In the exemplary embodiment, shown in FIGS. 2, 3 and 4, the cooperating instrumentalities 80 include a pair of elongated slots or channels 82 and 83 disposed on and radially projecting from diametrically opposed sides of the housing wall structure 34. Such slots or channels 82 and 84 are adapted to be slidably accommodate suitably shaped keys or projections 92 and 94, respectively, defined on and radially projecting from diametrically opposed sides of the cap wall structure 44.

Figure 5:
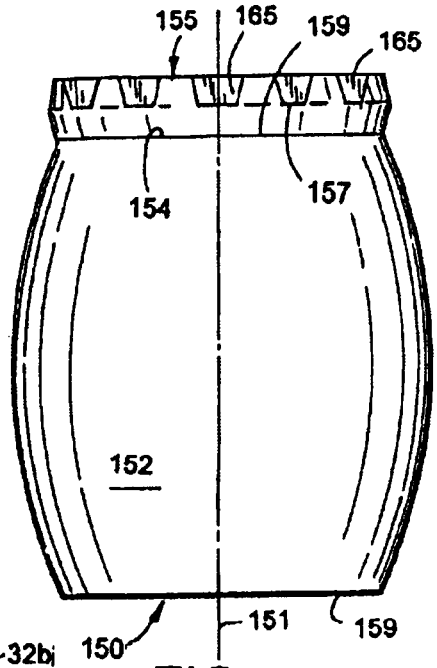
FIG. 5 is a side elevational view of an alternative form of energy absorption apparatus or spring assembly for a railroad car.

Another aspect of the present invention involves providing a heat protected spring assembly 150 for a railroad car energy absorption apparatus. As illustrated in FIG. 5, spring assembly 150 defines a central axis 151 and includes an elastomeric spring or member 152 and a thermal insulator or air spacer 155 operably secured to the spring member 152 and defining one end of the spring assembly 150. The purpose of the thermal insulator 155 is to reduce conductive heat transfer to the elastomeric spring or member 152 while furthermore promoting convective heat transfer away from the spring or member 152.

Suffice it to say, the elastomeric spring or member 152 is substantially similar and is formed like the spring or member 52 described above. The elements of spring or member 150 which are identical or functionally analogous to the elastomer spring or member 52 described above are designated by reference numerals identical to those used above with the exception this embodiment of spring or elastomer member used reference numerals in the one-hundred series.

In this form of spring assembly 150, that end of spring or member 152 adapted to be arranged adjacent to the heat source has insulator 155 operably secured thereto. When the spring assembly 150 is arranged in operable combination with an energy absorption apparatus i.e.,a railroad car side bearing as described above, the thermal insulator 155 must have two important characteristics. First, the insulator 155 must restrict the transfer of heat therethrough. Second, the thermal insulator 155 must have sufficient strength and durability to withstand the mechanical cyclic and impact loading applied thereto. A nylon material having a heat deflection temperature which is higher than the heat deflection temperature of the elastomeric spring 152, low thermal conductivity, and relatively high impact strength to withstand mechanical cyclic and loading is one material which appears to offer beneficial performance characteristics. Of course, other materials, i.e., plastics, having similar characteristics may equally suffice for the thermal insulator 155.

The shape of the thermal insulator 155 is dependent upon different factors. First, the configuration of the elastomeric spring 152 can influence the shape of the thermal insulator 155. Second, the disposition of the thermal insulator 155 relative to the interface between the car body and the elastomeric spring 152 can furthermore influence the shape of the thermal insulator 155.

When the spring assembly 150 is arranged in operable combination with an energy absorption apparatus i.e., a railroad car side bearing as described above, the thermal insulator 155 is disposed between the underside or undersurface 47 of the top plate 42 (FIG. 2) and the end surface 154 of the elastomeric spring 152. As shown, the thermal insulator 155 has a round disk-like configuration with a diameter generally equal to or slightly larger than the diameter of the end surface 154 of the elastomeric spring or member 152. The thermal insulator 155 is preferably configured with a pair of generally parallel and generally planar or flat surfaces 157 and 159.

When the thermal insulator 155 is operably secured to the elastomeric member 152 to form spring assembly 150, the thermal insulator surface 157 preferably abuts surface 154 of the elastomeric spring or member 152 while surface 159, defining an exposed end surface for spring assembly 150, is urged against the underside or undersurface 47 of the side bearing top plate 42 (FIG. 2). Preferably, surfaces 157 and 159 are minimally spaced by a distance sufficient to restrict heat transference to the spring element 152 while maximizing spring height. In one form, surfaces 157 and 159 are spaced apart a distance ranging between about 0.250 inches and about 1.0 inch. In a most preferred form, the thermal insulator 155 comprises about ⅕ to 1⁄20 of the distance between the ends of the spring assembly 150.

Figure 6:
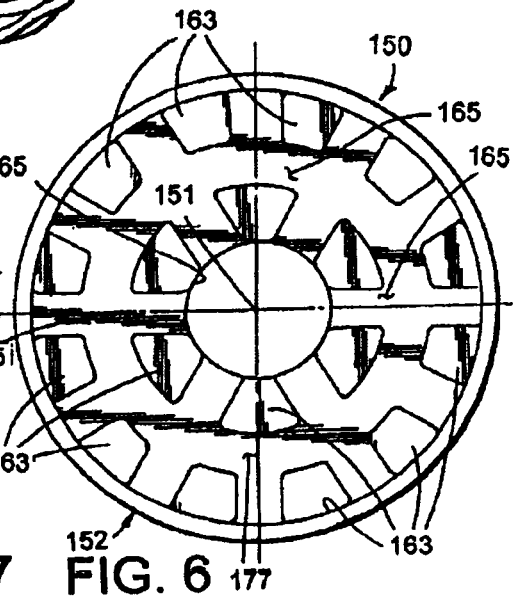
FIG. 6 is an enlarged top plan view of the spring assembly shown in FIG. 5.

As shown in FIG. 6, the free end of insulator 155 is preferably comprised of a series of lugs or buttons 163 arranged in a generally uniform pattern relative to each other and which combine to define the generally planar surface end 159 for spring assembly 150. Preferably, the free ends of the lugs or buttons 163 collectively comprise between about 30% and about 75% of the total surface area of surface 159. In a preferred form, configuring the lugs or buttons 163 such that their height comprises about ⅜ to about ¾ of the distance between the surfaces 157 and 159 appears to advantageously restrict heat transference to the elastomeric spring 152.

Notably, the lugs or buttons 163 are arranged relative to each other such that a plurality of air flow directing passages 165 are defined between opposed sides of adjacent lugs or buttons 163. As shown, the air flow directing passages 165 open to the sides of the thermal insulator 155 and extend generally normal to the central axis 151 of the spring assembly 150. As such, the passages 165 are configured to promote heat exchange by directing air across the interface between the thermal insulator 155 and the engaging surface 42 of member or cap 40 thereby promoting convective heat transfer from that end of the elastomeric spring 152 arranged adjacent the heat generating source to prolong the usefulness of the spring assembly 150. As will be appreciated, the air spacer 155 reduces the exposure of spring element 152 to heat.

Figure 7:
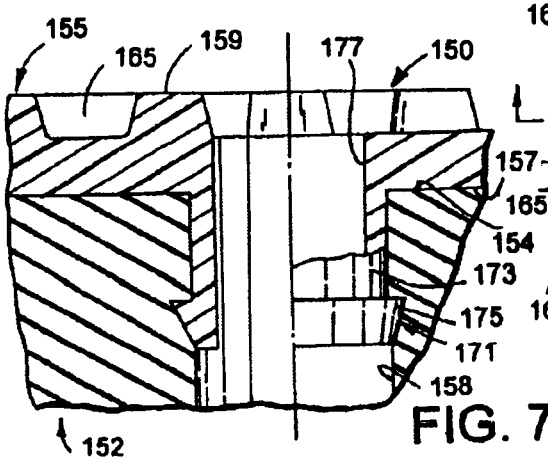
FIG. 7 is an enlarged sectional view taken along line 7-7 of FIG. 6.

To inhibit shifting movements of the thermal insulator 155 relative to the elastomeric spring 152, the thermal insulator 155 is operably secured to the spring member 152. As shown in FIG. 7, the thermal insulator 155 is preferably provided with structure 171 for positively securing the thermal insulator 155 to the elastomeric spring member 152. Of course, as an alternative to structure 171, the thermal resistor 155 could be adhesively secured to the end 154 of the spring member 152. Moreover, a device separate from but passing through and engaging both the thermal insulator 155 and the elastomeric spring 152 could alternatively be used to operably secure the thermal insulator 155 to the elastomer spring or member 152.

As shown in FIG. 7, spring 152 defines a bore or recess 158 which opens at least to end surface 154 of spring member 152. In one form, the structure 171 for positively securing the thermal insulator 155 to the elastomeric spring member 152 includes a tube or projection 173 which is preferably formed integral with the thermal insulator 155 and extends away and generally normal to surface 157 of the thermal insulator 155 and away from the buttons or lugs 163. The cross sectional configuration of the tube or projection 173 is preferably sized to fit and axially extend into the recess or bore 158 defined by spring member 152. Moreover, and to inhibit inadvertent separation with the spring 152, the projection to tube 173 is provided toward the free end thereof with a radial configuration or prong 175 which positively engages with the inner surface of the bore or recess 158 in a manner positively maintaining the thermal insulator 155 in operable association with the elastomeric spring or member 152.

Preferably, the projection 173 on insulator 155 defines a hollow passage 177 allowing the guide 48 on cap 40 to extend therethrough and into the bore or recess 148 in the spring member 152 whereby affecting positive positioning of the spring assembly 152 relative to the remaining components of the railroad car energy absorption apparatus. Moreover, the material used to form the thermal insulator 155 can be color coded to readily identify predetermined characteristics of the elastomeric spring assembly 150 operably associated therewith.

Figure 8:
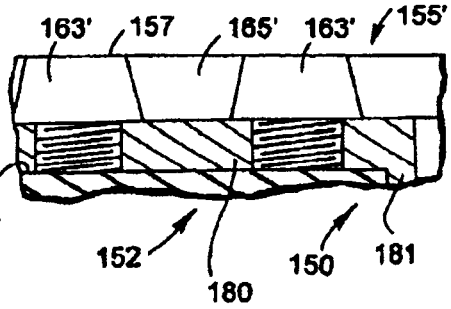
FIG. 8 is a partial sectional view of an alternative thermal insulator for the spring assembly shown in FIG. 5.

An alternative embodiment of the thermal insulator is illustrated in FIG. 8 and generally identified by reference numeral 155'. This alternative embodiment of thermal insulator comprises a series of buttons or lugs 163' which are substantially similar to the buttons or lugs 163 described above. The buttons or lugs 163' on spacer 155' are arranged relative to each other such that a series of air directing passages 165' are provided between the sides of adjacent lugs and which passages 165' extend generally normal to a central axis of the spring assembly 150'. In this embodiment, however, the buttons or lugs 163' project from and are operably secured to a metal plate 180. The lugs or buttons 163' can be secured in any suitable manner to the metal plate 180 with cooperating threads being illustrated as but one exemplary form of securement. Alternatively, the lugs 163' could be insert molded to the metal plate 180. Using a metal plate 180 as part of insulator 155' promotes the dissipation of heat away from that end of the elastomer spring or member 152 arranged proximate to the heat source. In this embodiment, the metal plate 180 defines structure 181 similar to structure 171 for operably securing the thermal insulator 155' to the elastomeric spring or member 152'.

Figure 9:
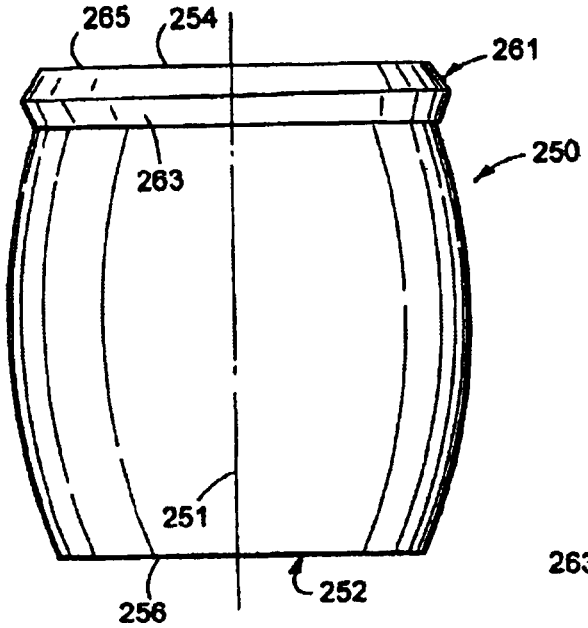
FIG. 9 is a side elevational view of another alternative form of energy absorption apparatus or spring assembly for a railroad car.

According to another salient feature, and as shown in FIG. 9, there is provided an elastomeric spring assembly 250 for a railroad car energy absorption apparatus. Spring assembly 250 defines a longitudinal axis 251 and includes a thermoplastic spring or member 252 along with an encapsulator 261 for inhibiting the elastomeric spring 252 from deteriorating as a result of repeated heat cycling applied to a localized area of the elastomeric spring or member 252.

The spring or member 252 for spring assembly 250 is substantially similar and is formed like the spring 52 described above. Moreover, and like spring 52, the spring element 252 has predeterminable load deflection characteristics associated therewith. The elements of spring 252 which are identical or functionally analogous to the elastomer spring 52 described above are designated by reference numerals identical to those used above with the exception this embodiment of spring or elastomer member used reference numerals in the two-hundred series.

Suffice it to say, and as shown in FIG. 9, the thermoplastic spring member 252 has two opposed ends 254 and 256. The encapsulator 261 of spring assembly 250 is arranged in operable association with that end of spring or member 252 subject to repeated heat cycling. The configuration of the encapsulator 261 is dependent upon different factors. First, the cross-sectional configuration of the elastomeric spring 252 influences the configuration of encapsulator 261. Second, the axial length of the spring 252, i.e., the axial distance between opposed ends 254 and 256 of spring 252, furthermore affects the configuration of the encapsulator 261.

In one form, the encapsulator 261 includes a closed band 263 extending axially along an outer surface of and away from the thermoplastic spring localized area subjected to repeated heat cycling. Band 263 is formed from material having a heat deflection temperature which is significantly higher than the heat deflection temperature of the thermoplastic spring element or member 252. For example, the band 263 can be formed from injection molded plastic or a suitable metal material having a generally uniform thickness preferably ranging between about 0.062 inches and about 0.375 inches. Preferably, the band 263 surrounds a lengthwise portion of the spring assembly 250 for a distance ranging between about 10% and about 35% of a distance measured between the ends 254, 256 of spring element 252. Alternatively, band 263 extends away from that end of the thermoplastic spring element or member 252 exposed to repeated heat cycling for a distance ranging between about 0.250 inches and about 2.0 inches.

Figure 10:
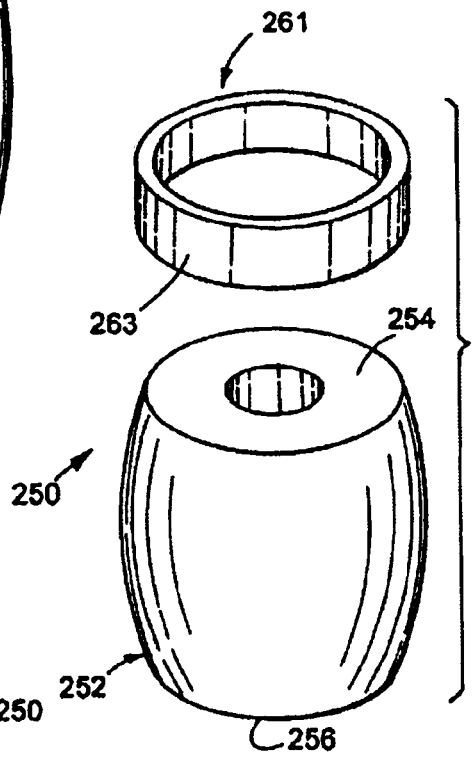
FIG. 10 is a perspective view of the spring assembly illustrated in FIG. 9 with components thereof illustrated in separated relation relative to each other.
Figure 11:
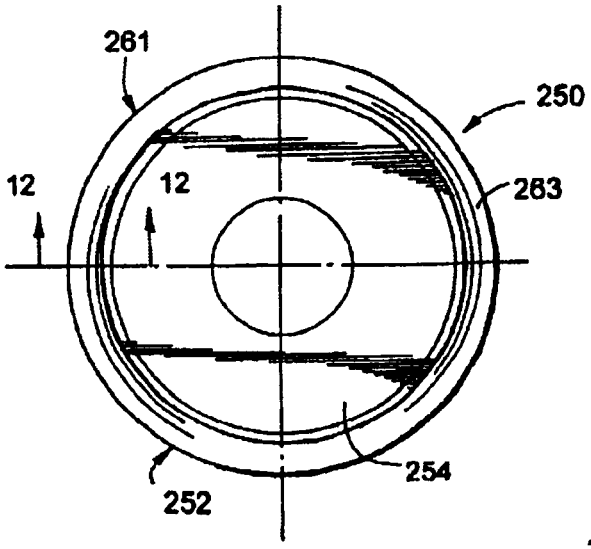
FIG. 11 is a top plan view of the spring assembly shown in FIG. 9.

In the exemplary embodiment illustrated in FIG. 9, the thermoplastic element or spring 252 has a generally cylindrical or barrel-like configuration between opposed ends 254 and 256. As such, and as shown in FIG. 10, the closed band 263 has an annular configuration. Turning to FIG. 11, and in the exemplary embodiment, the closed band 263 is sized to permit the band 253 to be snugly fit along and about that end of the thermoplastic spring element or member 252 with which it is to be arranged in operable combination. That is, the diameter of the closed, annular band 263 is slightly smaller than the diameter of that end of the thermoplastic spring element or member 252 with which it is to be arranged in operable combination.

Figure 12:
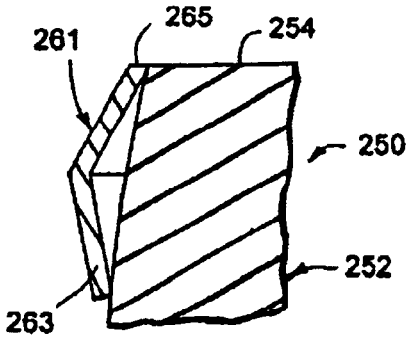
FIG. 12 is an enlarged sectional view taken along line 11-11 of FIG. 10.

After band 263 is about the end of the thermoplastic member 252 with which it is to be arranged in operable combination, member 252, with the closed band 263 fitted thereabout, is compressed. Compression of the member 252 and band 263 serves a dual purpose. First, and as explained in detail in the above-mentioned U.S. Pat. No. 4,198,037 to D., G. Anderson, compression of the material forming member 252 advantageously imparts spring-like characteristics to member 252. Second, compression of member 252 and the closed band 263 fitted thereabout operably secures the closed band 263 to the elastomeric spring element 252. Notably, and as illustrated in FIGS. 9 and 12, following compression of member 252 and the annular band or ring 263, an exposed or free edge 265 of band 263 is generally coplanar with the end 254 of the thermoplastic spring or element 252. As such, that localized region or area of the thermoplastic spring element or member 252 surrounded by the encapsulator 261, albeit exposed to repeated heat cycling, will maintain its proper shape and form and be inhibited from melting or deforming and losing its load deflection characteristics.

Moreover, and as illustrated in FIGS. 9, 11 and 12, compression of spring 252 and the annular band 263 causes a center section of the band 263 to radially bulge outwardly away from the spring element 252. Such deformation of the band or annular ring 263 remains after the compressive force is removed from the spring element 252 and annular band 263.

As will be appreciated, the deformed configuration of the annular band 263 reduces the "dead zone" in that area of the thermoplastic spring or element 252 surrounded by the encapsulator 261. That is, the deformation of the annular band 263 allows that portion of the spring element 252 operably associated with the encapsulator 261 to remain operably effective and considered when determining operational characteristics of spring assembly 252.

It will be understood, any one or combination of those structural features described above can be embodied in combination with a railroad car energy absorption apparatus whereby advantageously reducing the detrimental deterioration heat can have on a localized area of a spring assembly which embodies an elastomeric spring element or member. In accordance with one aspect, the housing for the energy absorption apparatus is configured to promote the dissipation of heat from the structural cavity wherein the elastomeric spring element is mounted and away from the energy absorption apparatus thereby prolonging usefulness of such apparatus. In the embodiment wherein the energy absorption apparatus is configured as a side bearing, the housing and cap surrounding the spring assembly are each configured with vents or openings, preferably maintained in registry with one another, whereby permitting air to move into the cavity housing the elastomeric spring element, permitting air to move around and about the elastomeric spring element in a cooling or temperature reducing manner, and, ultimately, allowing air to escape from the cavity whereby venting heat away from the elastomeric spring element so as to prolong the usefulness of the spring element and, thus, the side bearing. When configured as a side bearing, the top plate of the cap is preferably furthermore vented to promote the free convection of heat from the cavity in which the elastomeric spring element is housed.

Although extending only about ⅕ to about 1⁄20 of the overall distance of the spring assembly, a primary function of the thermal insulator is to protect the elastomeric spring element of the spring assembly against heat damage by restricting conductive transfer of heat resulting from "hunting" movements of the wheeled truck on which the spring assembly is mounted. Notably, such thermal insulator offers a simplistic and cost effective design for protecting the elastomeric spring element and, thus, the entire spring assembly against localized heat damage. Additionally, the thermal insulator is preferably secured to the elastomeric spring element to inhibit separation therebetween whereby facilitating inventorying and appropriate usage.

One salient feature of the thermal insulator relates to providing a series of passages at that end of the spring assembly for directing air across an interface between the spring assembly and the source of heat thereby dissipating heat from the end of the elastomeric spring arranged adjacent or proximate to the source of heat. While offering beneficial results when used by itself, the air passages extending across one end of the thermal insulator provide a particular advantage when such thermal insulator is arranged in operable combination with an elastomeric spring assembly housed within energy absorption apparatus structure which is vented in the manner described above by promoting convective heat transfer from that end of the elastomeric spring assembly exposed to localized heat buildup.

Moreover, forming the thermal insulator from a suitable plastic or nylon material readily allows color coding of the thermal insulator whereby identifying particular characteristics of the elastomeric spring assembly with which the insulator is arranged in operable combination. Additionally, providing the insulator with series of lugs in a prearranged spaced pattern relative to each other reduces the overall weight of the thermal insulator. If desired, a metal plate can be used to mount the lugs of the thermal insulator whereby further promulgating heat transfer away from the end of the elastomeric spring assembly.

In accordance with another aspect, there is provided a spring assembly for absorbing and returning energy between two masses. The spring assembly includes an elastomeric spring having an encapsulator or closed ring arranged in operable combination with that end of the spring subject to localized deformation and deterioration resulting from repeated heat cycles. As known, the elastomeric spring for the spring assembly has predetermined load deflection characteristics. The purpose of the encapsulator is to inhibit the associated local portion of elastomeric spring from deforming after exposure to those heat deflection temperatures which would normally cause spring performance deformation or deterioration whereby assisting the elastomeric spring to maintain those predetermined load characteristics for which the spring was designed.

To limit the "dead zone" characteristics for the spring assembly, the encapsulator or closed ring extends a limited axial distance between opposed ends of the spring assembly. That is, the encapsulator or closed ring extends between about 10% and about 35% of the overall axial length of the spring assembly. Moreover, the encapsulator or closed ring is preferably designed to deform under compression of the spring assembly whereby furthermore reducing any "dead zone" associated with the elastomeric spring assembly.

From the foregoing it will be readily appreciated and observed that numerous modifications and variations can be effected without departing from the true spirit and scope of the novel concept of the present invention. It will be appreciated that the present disclosure is intended to set forth exemplifications of the present invention which are not intended to limit the invention to the specific embodiments illustrated. The disclosure is intended to cover by the appended claims all such modification and colorful variations as fall within the spirt and scope of the claims.

What is claimed is:

1. A side bearing assembly for a railway vehicle, comprising:

a housing with wall structure;

a cap arranged for generally coaxial movement relative to said housing and having a generally planar surface with wall structure depending from said surface;

an elastomeric spring accommodated within a cavity operably defined by said housing and said cap; and wherein said housing wall structure and said cap wall structure are each configured to promote dissipation of heat from said cavity and away from said elastomeric spring thereby prolonging effective usefulness of said side bearing assembly.

2. The side bearing *assembly* according to claim 1 wherein the wall structure of said housing and said cap are each configured to limit generally horizontal shifting movements of said cap relative to a longitudinal axis of said housing.

3. The side bearing *assembly* according to claim 2 wherein the wall structure of each of said housing and said cap define openings arranged to opposite lateral sides of [said] *an* upstanding axis and which are generally aligned relative to each other to promote movement of air though said side bearing *assembly*.

4. The side bearing *assembly* according to claim 3 wherein a closed marginal edge surrounds each opening defined by said cap, with a pair of opposed edges of said closed marginal edge extending away from the planar surface of said cap toward a free end of the [sidewall] *wall structure of said cap* for a distance measuring between about 35% and about [600/o] *60%* of a distance measured between said planar surface of said cap and the free end of the [sidewall] *wall structure* of said cap.

5. The side bearing *assembly* according to claim 1 wherein the planar surface of said cap is configured to promote convective [and conductive] heat transfer from the cavity operably defined between said housing and said cap.

6. The side bearing *assembly* according to claim 1 wherein said housing and said cap define cooperating instrumentalities for inhibiting rotation of said cap relative to said housing.

7. The side bearing assembly according to claim 1 wherein said [sidewall] *wall* structure on said housing has a noncomplete configuration toward one free end thereof.

8. The side bearing assembly according to claim 1 wherein said [sidewall] *wall* structure on said housing comprises between about 30% and about 70% of a free end boundary of said [sidewall] *wall* structure on said housing.

9. The side bearing assembly according to claim 1 wherein said elastomeric spring is formed from an elastomer having a ratio of plastic strain to elastic strain that is greater than 1.5 to 1.

10. A side bearing assembly adapted to be disposed intermediate a bolster and a car body of a railroad vehicle, said side bearing *assembly* comprising:

a housing including a base configured with apertured mounting portions for permitting the base of said housing to be secured to said bolster, the apertures in said mounting portions being aligned along a first axis, said housing further including upstanding wall structure integrally formed with said base and defining a second axis for said housing, with said second axis extending substantially normal to and generally intersects with the first axis;

a generally round cap adapted to telescopically move relative to said housing, said cap including a generally planar surface configured to contact and slide along an undersurface of said car body, with said cap further including wall structure formed integral with and depending from said surface and defining, with the wall structure of said housing, an internal void within said side bearing *assembly*;

a thermoplastic spring operably arranged between said housing and said cap within said internal void for urging the planar surface of said cap toward sliding engagement with the undersurface of said car body; and wherein the wall structures of said housing and said cap are each configured relative to each other to permit venting of heat from said internal void thereby prolonging usefulness of said thermoplastic spring.

11. The side bearing assembly according to claim 10 wherein said housing and said cap define cooperating instrumentalities for inhibiting rotation of said cap relative to said housing.

12. The side bearing assembly according to claim 10 wherein the wall structure of said housing and said cap each define openings arranged to opposite lateral sides of the second axis of said housing and which are generally aligned relative to each other to promote movement of air though said side bearing *assembly*.

13. The side bearing assembly according to claim 10 wherein the planar surface of said cap is configured to promote convective [and conductive] heat transfer from the internal void of said side bearing *assembly*.

14. The side bearing assembly according to claim 10 wherein said thermoplastic spring has a generally cylindrical configuration between opposed ends thereof, with at least one end of said spring defining an open ended recess.

15. The side bearing assembly according to claim 14 wherein at least one of said housing and said cap defines a generally centralized guide which is at least partially accommodated within the recess in said spring whereby positively positioning said spring within said internal void of said side bearing *assembly*.

16. The side bearing *assembly* according to claim 15 further including a stop for limiting vertical displacement of said cap toward the base of said housing during operation of said side bearing *assembly* on said railroad vehicle.

17. The side bearing assembly according to claim 10 wherein said wall structure on said housing has a noncomplete configuration toward one end thereof.

18. The side bearing assembly according to claim 17 wherein said wall structure on said housing comprises between about 30% and about 70% of a free end boundary of said wall structure on said housing.

19. The side bearing assembly according to claim 10 wherein said thremoplastic spring is formed from an elastomer material having a ratio of plastic strain to elastic strain that is greater than 1.5 to 1.

20. The side bearing assembly according to claim 10 wherein said thermoplastic spring defines a generally centralized throughbore which is open at opposite ends thereof.

21. The side bearing assembly according to claim 20 wherein at least one of said housing and said cap [define] *defines* a guide adapted to *at least partially* fit *lengthwise* within the throughbore on said spring whereby positively positioning said spring within [the] said internal void defined by the wall structures of said housing and cap.

22. A side bearing assembly to be disposed intermediate an elongated bolster and a car body of a railroad vehicle, said side bearing *assembly* comprising:

a housing with sidewall structure;

a cap having a generally planar surface for engaging a bottom of said car body, said cap further having sidewall structure depending from said car body engaging surface;

an elastomeric spring operably arranged between said housing and said [top] cap within a cavity operably defined by the sidewall structures of said housing and said cap for urging and maintaining the planar surface of said cap toward the bottom of said car body; and wherein said housing and said cap each being configured to allow axial movement of said cap relative to said housing while inhibiting rotation therebetween, and with the sidewall structures of said housing and said cap each being configured relative to each other to permit venting of heat from the cavity defined by the sidewall structures of said housing and said cap whereby prolonging usefulness of said elastomeric spring.

23. The side bearing assembly according to claim 22 wherein said cap is configured to promote free convection of heat from the cavity of said side bearing *assembly*.

24. The side bearing assembly according to claim 22 wherein said housing sidewall structure comprises between about 30% and about 70% of a free end boundary of said housing sidewall structure.

25. The side bearing assembly according to claim 22 wherein said elastomeric spring has a generally cylindrical configuration between opposed ends thereof, with at least one end of said spring defining an open ended recess.

26. The side bearing assembly according to claim 25 wherein at least one of said housing and said cap defines a generally centralized guide which is at least partially accommodated within the recess defined by said spring whereby positively positioning said spring within said cavity of said side bearing *assembly*.

27. The side bearing assembly according to claim 22 further including a stop for limiting axial displacement of said cap during operation of said side bearing *assembly* on said railroad vehicle.

28. The side bearing *assembly* according to claim 22 *wherein* said housing and said cap each define openings which are generally aligned relative to each other when said housing and said cap are arranged in operable combination relative to each other so as to promote air flow through said side bearing *assembly* and away from the elastomeric spring.

*29. A side bearing assembly for a railway vehicle, comprising:*

*a housing with wall structure;*

*a cap arranged for generally coaxial movement relative to said housing and having a generally planar surface with wall structure depending from said surface;*

*an elastomeric spring accommodated within a cavity operably defined by said housing and said cap; and*

*wherein said housing and at least a portion of the wall structure of said cap each define openings which are in communication relative to each other so as to promote dissipation of heat from said cavity and away from said elastomeric spring thereby prolonging effective usefulness of said side bearing assembly; and*

*wherein said cap and said housing define cooperating instrumentalities for maintaining the openings in said cap in fixed relation relative to said housing.*

*30. A side bearing assembly for a railway vehicle, comprising:*

*a housing having wall structure extending upwardly from a base of said housing, with said wall structure of said housing defining an open-top cavity, and wherein said housing has openings at a bottom thereof;*

*an elastomeric spring accommodated within said open-top cavity of said housing; and*

*a cap arranged for generally coaxial movement relative to said housing and having a generally planar surface and wall structure depending from said surface, with said generally planar surface on said cap being resiliently urged by said spring against an underside of said railway vehicle, and wherein said cap has at least two openings defined, at least in part, by the wall structure of the cap, with said openings defined by said cap being substantially unobstructed by the underside of said railway vehicle such that air passages are defined between the bottom of said housing and the openings in said cap to promote the dissipation of heat from said cavity and away from said elastomeric spring thereby prolonging the usefulness of said side bearing assembly.*

*31. The side bearing assembly according to claim 30, wherein the openings defined by said housing extend into at least a portion of the wall structure and the bottom of the housing, and wherein at least a portion of the openings in the bottom of said housing are disposed in generally normal relation relative to the axis along which the apertures in said mounting flanges are aligned.*

*32. The side bearing assembly according to claim 30, wherein said housing and cap define cooperating instrumentalities for inhibiting rotation of said cap relative to said housing.*

*33. A side bearing assembly adapted to be disposed intermediate a bolster and a car body of a railway vehicle, said side bearing assembly comprising:*

*a housing having sidewall structure extending upward from a base of said housing and defining a first axis, said housing being configured with apertured mounting portions for permitting said housing to be secured to said*

*bolster, the apertures on said mounting portions being aligned along a second axis extending generally normal to said first axis, and with said housing defining an open-top cavity and a plurality of openings arranged in the vicinity of an intersection between the sidewall structure and the base of said housing and opening to said cavity;*

*a generally round cap adapted to telescopically move relative to said housing, said cap having a generally planar top surface, with said cap further including sidewall structure formed integral with and depending from said top surface;*

*a thermoplastic spring arranged within the open-top cavity defined by said housing and operably disposed between an underside of the top surface of said cap and a lower surface defining said open-top cavity for urging the generally planar top surface of said cap into frictional sliding contact with an undersurface of said car body; and*

*wherein said cap defines, at least in part, a plurality of openings which are substantially unobstructed by the undersurface of said car body, and with the openings in said cap cooperating with the openings in said housing so as to permit venting of heat from said cavity thereby prolonging the usefulness of said thermoplastic spring; and*

*wherein said housing and said cap define cooperating instrumentalities for inhibiting the openings in said cap from rotating relative to said housing and about said first axis.*

*34. The side bearing assembly according to claim 33, wherein at least a portion of the plurality of openings defined by said housing are disposed in generally normal relation relative to the second axis along which the apertures in said mounting portions are aligned.*

*35. A side bearing assembly for a railway vehicle, comprising:*

*a housing having wall structure extending upwardly from a base of said housing, with said wall structure of said housing defining an open-top cavity, and wherein said housing defines openings at a bottom thereof to promote dissipation of heat from said open-top cavity and away from an elastomeric spring, with said housing further having mounting flanges radially extending from opposed sides of said housing, and with the mounting flanges on said housing each defining an aperture, with the apertures in said mounting flanges being aligned relative to each other along an axis;*

*said elastomeric spring being accommodated within said open-top cavity of said housing; and*

*a cap arranged for sliding and generally coaxial movement relative to said housing, said cap having a generally planar surface with wall structure depending from said generally planar surface, and a central open-bottom cavity which operably coacts with the open-top cavity defined by said housing to accommodate said elastomeric spring therewithin and such that, after said side bearing assembly is arranged in operable combination with said railway vehicle, said generally planar surface on said cap is resiliently urged by said spring against an underside of said railway vehicle, and with said cap further defining a plurality of openings for allowing air to pass into and from the open-bottom cavity in said cap to promote dissipation of heat from said open-bottom cavity and away from said spring, with said openings in said cap being defined in the vicinity of an intersection between said wall structure and said generally planar surface on said cap such that the openings in said cap remain substantially unobstructed by the underside of said railway vehicle; and*

*wherein said housing and cap have cooperating instrumentalities for inhibiting the openings in said cap from rotating relative to said housing.*

*36. The side bearing assembly according to claim 35, wherein the openings defined by said housing extend into at least a portion of the wall structure and the bottom of the housing.*

*37. The side bearing assembly according to claim 35, wherein the plurality of openings defined by said cap includes at least two openings which are generally aligned relative to each other along an axis.*

*38. The side bearing assembly according to claim 35 further including a stop for limiting axial displacement of said cap during operation of said side bearing assembly on said railway vehicle.*

* * * * *